Feb. 17, 1931.  H. P. EASTMAN  1,792,577
PLOW APPLICATOR
Filed Jan. 23, 1926  3 Sheets-Sheet 1

HAL P. EASTMAN.
INVENTOR.

BY /s/ A. C. Bierman
ATTORNEY.

Feb. 17, 1931.    H. P. EASTMAN    1,792,577
PLOW APPLICATOR
Filed Jan. 23, 1926    3 Sheets-Sheet 2

HAL P. EASTMAN.
INVENTOR.

BY *J. H. C. Bierman*

ATTORNEY.

Feb. 17, 1931.    H. P. EASTMAN    1,792,577
PLOW APPLICATOR
Filed Jan. 23, 1926    3 Sheets-Sheet 3

HAL P. EASTMAN.
INVENTOR.

BY H.C. Birman
ATTORNEY.

Patented Feb. 17, 1931

1,792,577

UNITED STATES PATENT OFFICE

HAL P. EASTMAN, OF MONROVIA, CALIFORNIA, ASSIGNOR TO OWL FUMIGATING CORPORATION, OF NEW YORK, N. Y., A CORPORATION OF DELAWARE

PLOW APPLICATOR

Application filed January 23, 1926. Serial No. 83,328.

This invention relates to the distribution of solid material for the eradication of insects or other pests which infect the ground, and more particularly to a mechanism which may be attached to a plow, harrow or other earth-working implement well known to agriculturalists, for the purpose of distributing in the ground a certain definite and variable amount of the solid fumigant or insecticide.

It is among the objects of this invention to provide a simple apparatus which may be easily removable from the plow or the like and may be readily and effectively operated to deliver constant or varying amounts of the solid material to the ground.

It is also among the objects of this invention to provide an apparatus which may be attached to a plow and the like in such a manner that it shall not disturb the balance of the plow, or, in other words, shall in no manner interfere with the normal working of the implement.

The invention as embodied in a particular working form consists essentially of a container for solid material which may be distributed by suitable driving and ejecting mechanism, either into the furrow produced by the previous passage of the plow, or onto the surface of the ground, which is immediately turned under. The container is so placed that the entire mechanism, of which the filled container may be the heaviest part, is within the center of gravity of the plow, and therefore there is no tendency of the container with its mass of material to overturn or unbalance the plow. The container is removably secured by means of a yoke to the beam of the ordinary walking plow, or a similar member of the sulky plow or other similar implement. On the opposite side of the beam, and tending in part to balance the weight of the container and the material therein, is a driving mechanism which includes a wheel making contact with the ground and transmitting motion to a set of bevel or other gears, whereby the ratio of speeds of the driving wheel and the driven shaft may be varied to a large degree. The driven shaft is connected to a screw conveyor which accurately measures the amount of solid material delivered from the container to the ground in accordance with the speed thereof, which is controlled by the speed of the plow and the ratio of the gearing between the wheel and the driven shaft.

Any suitable material may be used in the container for the eradication of insects and the like, but I prefer to use a material known as Cyanogas which is a finely divided, solid material, the composition of which has not been definitely established but which probably includes a very large proportion (over 50%) of the cyanides of calcium and sodium. This material, when applied to the ground and covered with earth, rapidly decomposes in the soil, liberating gaseous hydrocyanic acid, which eliminates the pests therein, such as nematodes, wireworms, millipedes, sowworms, cut-worms, and the like.

In the accompanying drawings constituting a part hereof and in which like reference characters indicate like parts:

Figure 4:
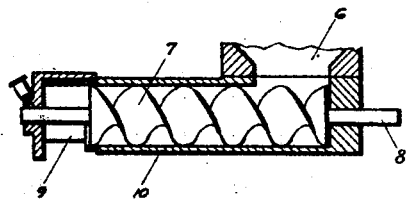
Fig. 4 is an enlarged vertical cross-sectional view of the screw conveyor.
Figure 1:
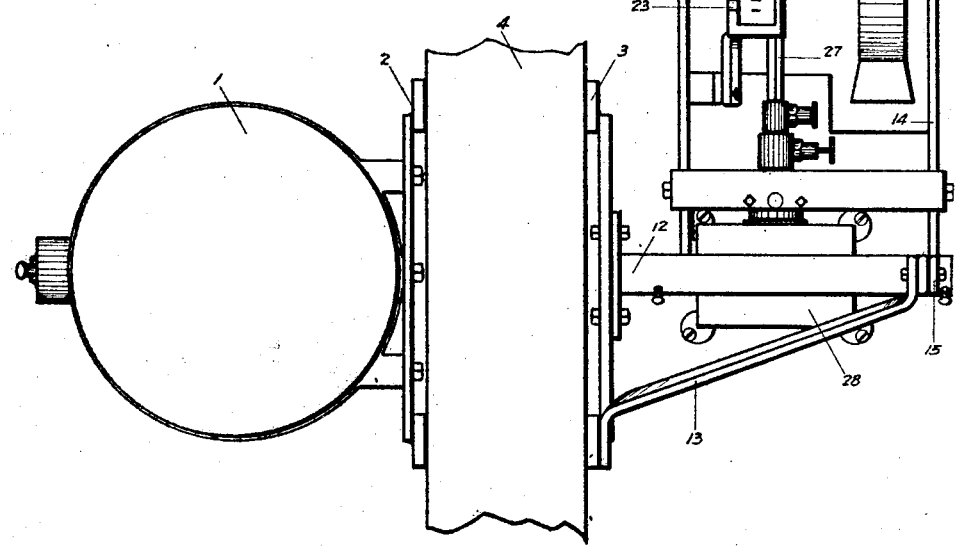
Fig. 1 is a top plan view of an apparatus made in accordance with this invention and shown attached to a portion of the beam of a walking plow.
Figure 6:
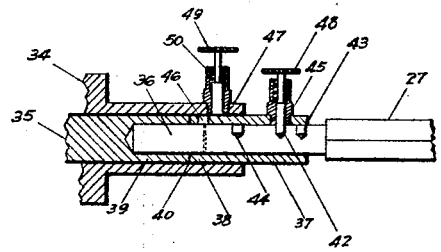
Fig. 6 is a similar, fragmentary view showing the gear mechanism in another position.

The container 1 is secured to a portion 2 of a yoke, the second portion 3 thereof being placed on the opposite side of the beam 4 of the plow or other implement, and secured together and to the beam by means of bolts 5, so that by loosening or removal of the bolts the device may be removed from the plow, a number of openings 5' being provided for bolts 5 to allow the use of the yoke on various shapes of beams. The lower portion 6 of the container 1 is formed in the shape of a cone terminating in an opening which communicates with a screw member 7 which is connected to a stub shaft 8 and is adapted to be rotated by said shaft to transmit material from the hopper 6 to the open end 9 of the tube 10 which encloses the screw 7. The material falls from the opening 9 onto the ground directly in the path of the plow and is immediately covered over by the overturning of the earth. A cover 11 is provided on the container to allow filling thereof and to seal the same from the air during the operation of the device.

From the portion 3 of the yoke there extends a support 12 having a bracing member 13 to which support is pivoted a frame 14 at point 15, the outer end of the frame carrying an axle 16, upon which is mounted a wheel 17 carrying flanges 17' for making good contact with the ground. Secured to one side of the wheel 17 is a disc gear 18 carrying on its face a plurality of sets 18' of gear teeth concentrically arranged. Secured to the frame 14 is a member 19 which carries a fork or yoke 20 resting in a constricted portion or neck 21 of bevel gear 22, which meshes with the disc gear 18. The member 19 is provided with a series of slots 23 constituting a saw-tooth portion and which is adapted to hold the prong 24 of a spring pressed handle 25 pivoted to the yoke 20 at point 26. By raising the handle 25 so that the prong 24 is lifted from the portion 23, the gear 22 may be shifted so as to change the ratio between the driving wheel 17 and the driven gear 22.

The bevel gear 22 is slidably mounted on a square shaft 27 which is adapted to make connection with two sets of bevel gears contained in the gear box 28 and which drive the shaft 29. Bevel gears 30 and 31 are secured to the said shaft 29 by set screws 32 and 33 respectively and mesh with gears 34 and 35, respectively. Shaft 27 has a cylindrical constricted portion 36 and is surrounded by a sleeve 37 having a tongue 38 at its outer end, the gear 35 being integral with a sleeve 39 having a slot 40 corresponding to the tongue 38 and adapted to interlock therewith at a certain period of the operation. The gear 34 is integral with a sleeve 41 which surrounds sleeves 37 and 39 and is held in a bearing which supplies lubrication for all the operating parts.

Openings 42, 43 and 44 are provided in the reduced portion 36, openings 45 and 46 are provided in sleeve 37, and an opening 47 is provided in the sleeve 41. Pins 48 and 49 are fitted into openings 45 and 47, respectively, and are held in contact with the several sleeves by springs 50.

Figure 5:
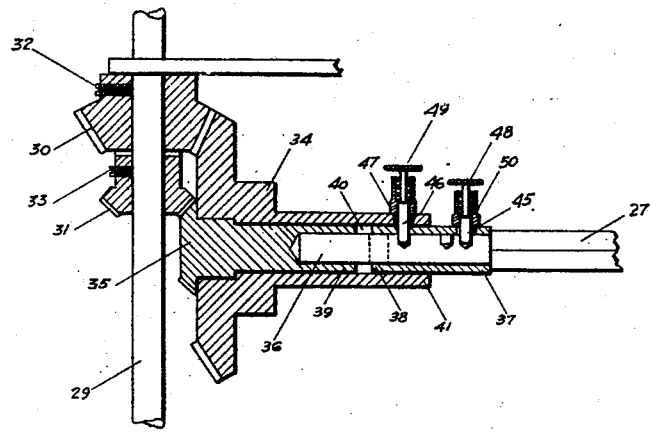
Fig. 5 is horizontal cross-sectional view taken through the gear box shown in Fig. 1 and illustrating the operation of a portion of the changed speed mechanism.

In the operation of the device, in order to transmit motion from shaft 27 to shaft 29, when the parts are in the position shown in Fig. 5 the shaft 27 is fixed to the sleeve 37 by means of pin 48 so that the two rotate together. However, since there is no driving connection between sleeve 37 and sleeve 39, the gears 31 and 35 are not driven. The pin 49, extending through sleeve 41, sleeve 37 and reduced portion 36, forms a driving connection between shaft 27 and bevel gears 30 and 34, thus driving the shaft 29 at a certain rate. In order to change the ratio the pins 48 and 49 are raised, sleeve 37 is moved forward so that tongue 38 enters slot 40, and the pin 48 is allowed to drop into opening 42, the pin 49 riding on sleeve 37, thus forming a driving connection between shaft 27, sleeve 37, sleeve 39 and the set of bevel gears 31 and 35, thus driving shaft 29 at a different rate.

Figure 2:
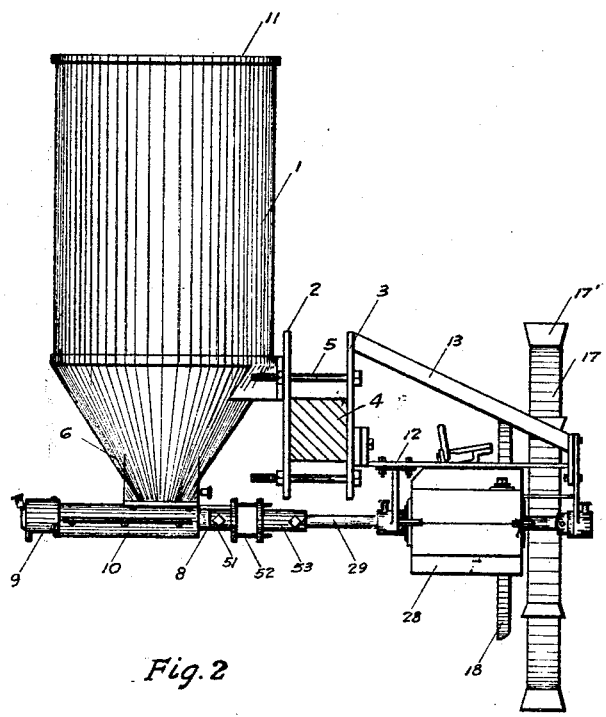
Fig. 2 is a front elevational view of the same apparatus.

Firmly secured to shaft 8 at the end adjacent to shaft 29 is a member 51 bearing a pair of pins 52 extending in the direction of and parallel to the shafts 8 and 29, Fig. 2. A similar member 53 is secured to the adjacent end of shaft 29 and has a pair of openings with which the pins 52 register and form a driving connection between the two shafts. This connection is for the purpose of allowing the mechanism to accommodate itself to varying widths of plow beams. It has a further function in allowing the separation of the mechanism into two principal parts, one of which may be roughly considered as the material feeding mechanism and the other the variable speed driving mechanism. Such an arrangement allows the device to be packed in small bulk for shipment, and it also makes it much easier to attach to and remove from the plow.

Figure 3:
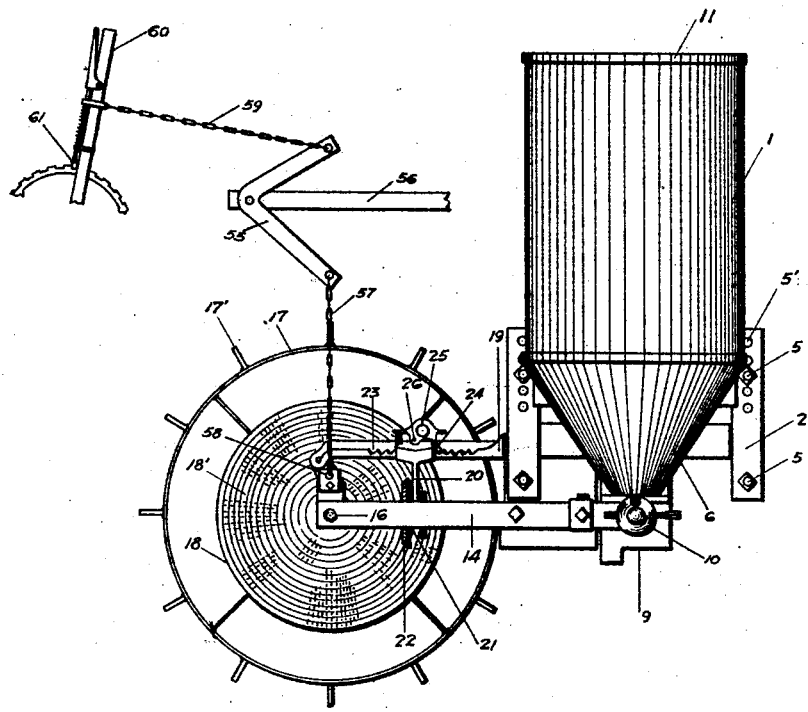
Fig. 3 is a side elevational view thereof.

In order to prevent feeding of material when the plow is in motion, as is often desirable, there is provided a simple mechanism for raising the wheel 17 from the ground and holding it in suspended position. To accomplish this there is provided a lever 55 pivoted to a beam 56, shown broken away in Fig. 3 for clearness but which is secured to portion 3 of the yoke in any suitable manner, one end of the lever being connected by a chain 57 to the portion 58 of frame 14, and the other end being connected by chain 59 to operating lever 60 containing a stop mechanism 61, which is mounted on the handle of the plow.

The operation of this mechanism is as follows: A sufficient amount of Cyanogas or other material is placed in the container 1, the cover 11 is secured thereto, and the whole mechanism secured to the beam 4 of the plow by means of bolts 5. The plow is set in motion over the ground to be worked, and the handle 60 is released to allow frame 14 and wheel 17 to drop and make contact with the ground. The rotation of the wheel causes a movement of disc gear 18 driving the bevel gear 22, causing rotation of the shaft 27 which is transmitted through one or the other of the sets of bevel gears 30—34 or 31—35. This causes rotation of the shafts 29 and 8 and corresponding rotation of screw 7 which moves material from the hopper and distributes it through opening 9 onto the ground at a definite ratio, say, 100 lbs. per acre. If it is desired to either increase or decrease the amount of material delivered to the ground per acre, as is necessary for the treatment of different types of pests, it is merely necessary to change the ratio between wheel 17 and feed screw 7. This may be done by either or both of the adjustments provided for this purpose. For instance, the bevel gear 22 may be shifted nearer to or farther from the periphery of the disc gear 18, and the ratio may be further changed by driving one or the other of the sets of bevel gears 30—34 and 31—35. If it is desired to stop the feeding of material, the handle 60 is manipulated so as to raise the frame 14 and wheel 17 from the ground.

Although I have described my invention setting forth a single embodiment thereof, the invention is not limited to the structure or the details shown and described. For instance, it is not absolutely essential that the driving mechanism and the feeding mechanism be placed on opposite sides of the beam of the plow, although I prefer to do so for convenience. It is merely necessary that the center of gravity of the mechanism as a whole be such as not to overbalance the plow, and the opening from the container which distributes the material be in such a position as to drop the material either in the preceding furrow or upon the ground to be turned by the plow, as may be desired. My invention is confined neither to the use of a screw conveyor for doing the actual feeding, nor to several sets of bevel gears for providing a variable ratio between the driving and driven members, as it is apparent that many mechanisms of different types for doing the same work are used, and have long been well known in the mechanical arts. Instead of sets of gears or similar mechanisms for varying the rate of application of the fumigant to the soil, I may vary the rate by changing the size of a slot or other opening through which the fumigant passes, or the rate may be varied by an engine drive in accordance with the speed of the plow. My invention contemplates many changes in the physical structure of the apparatus, the essentials of my invention being set forth in the claims appended hereto.

What I claim is:

1. A plow applicator comprising a separable supporting member adapted to be secured to a plow or other earth working implement, means pivotally carried thereby and supporting a ground contact operating wheel, a container for holding solid material to be applied to the ground, and means for distributing said material in a pre-determined ratio during the movement of said plow.

2. A plow applicator comprising a separable supporting member adapted to be secured to the beam of a plow, a container on one side for holding material to be applied to the ground, operating mechanism therefor on the other side including a ground engaging wheel carried by a frame pivoted to said supporting member, and a driving connection therebetween.

3. A plow applicator comprising a supporting member adapted to be secured to the beam of a plow, a container on one side for holding material to be applied to the ground, operating mechanism therefor on the other side, a driving connection therebetween, said mechanism including a wheel operated by contact with the ground, and variable speed gearing between said wheel and driving connection on the same side as the operating mechanism.

4. A plow applicator comprising a supporting member adapted to be secured to the beam of a plow, a container on one side for holding material to be applied to the ground, operating mechanism therefor on the other side, a driving connection therebetween, said mechanism including a wheel operated by contact with the ground, variable speed gearing between said wheel and driving connection, and means for raising said wheel from the ground.

5. A plow applicator comprising a supporting member adapted to be secured to a beam of a plow, a container on one side for holding material to be applied to the ground, operating mechanism therefor on the other side including a pivotally supported ground engaging wheel, a driving connection therebetween, and a screw arrangement below the container for feeding material from said container.

In testimony whereof, I have hereunto set my hand at Azusa, California, this 7th day of January 1926.

HAL P. EASTMAN.